(12) United States Patent
Zeng

(10) Patent No.: US 11,523,195 B2
(45) Date of Patent: Dec. 6, 2022

(54) INTELLIGENT SPEAKER WITH ENERGY STORAGE POWER SUPPLY

(71) Applicant: SHENZHEN DBK ELECTRONICS CO., LTD, Shenzhen (CN)

(72) Inventor: Jinhui Zeng, Shenzhen (CN)

(73) Assignee: SHENZHEN DBK ELECTRONICS CO., LTD, Shenzhen (CN)

( * ) Notice: Subject to any disclaimer, the term of this patent is extended or adjusted under 35 U.S.C. 154(b) by 0 days.

(21) Appl. No.: 17/412,147

(22) Filed: Aug. 25, 2021

(65) Prior Publication Data

US 2022/0272431 A1    Aug. 25, 2022

(51) Int. Cl.
  *H04R 25/00*       (2006.01)
  *H04R 1/02*        (2006.01)
  *H01M 50/204*      (2021.01)

(52) U.S. Cl.
  CPC .......... *H04R 1/025* (2013.01); *H01M 50/204* (2021.01); *H01M 2220/30* (2013.01); *H04R 2420/07* (2013.01)

(58) Field of Classification Search
  CPC .... H01R 24/64; H01R 24/66; H01R 2107/00; H04R 1/028; H02J 7/0027; H02J 7/0014; H02J 7/0044; H02J 7/0042
  See application file for complete search history.

(56) References Cited

U.S. PATENT DOCUMENTS 10,021,486 B1 *   7/2018   Brennan ................... H04R 5/02
10,058,089 B1 *   8/2018   Stephens ................ G10K 9/122

* cited by examiner

*Primary Examiner* — Amir H Etesam
(74) *Attorney, Agent, or Firm* — Sinorica LLC

(57) ABSTRACT

The utility model discloses an intelligent speaker with an energy storage power supply, comprising an intelligent speaker host and a power box, wherein the bottom of the intelligent speaker host is connected with the top of the power box. The intelligent speaker host is equipped with a plurality of battery packs, which effectively enhance the power supply capability of the energy storage power supply. In addition, all the battery packs are isolated by the storage plate to prevent collision. The intelligent speaker and the battery pack can be easily disassembled for carrying around.

6 Claims, 4 Drawing Sheets

INTELLIGENT SPEAKER WITH ENERGY STORAGE POWER SUPPLY

TECHNICAL FIELD

The utility model belongs to the technical field of speaker, in particular to an intelligent speaker with an energy storage power supply.

BACKGROUND ART

A speaker refers to a device that can convert audio signals into sound. Generally speaking, it means that the speaker box or subwoofer box is provided with its own power amplifier, which amplifies the audio signal and then reproduces the sound by the speaker itself to make sound louder. An intelligent speaker is an upgraded product of speaker, and it is a tool for household consumers to surf the Internet by voice, with which users can play songs on demand, shop online, or know the weather forecast, also control smart home devices, such as opening curtains, setting refrigerator temperature, and enabling a water heater to heat up in advance.

However, most of the existing intelligent speakers are directly connected to household circuits. In case of power failure or movement of speaker, intelligent speakers can't be used because there is no power supply or corresponding power socket. Now, some intelligent speakers on the market can be powered by an energy storage power supply, but the power of energy storage power supply is not enough to supply an intelligent speaker for a long time. Therefore, it is necessary to improve the structure of intelligent speakers, and propose an intelligent speaker with an energy storage power supply, so as to better solve the above problems.

CONTENTS OF THE UTILITY MODEL

The utility model aims at providing an intelligent speaker with an energy storage power supply in order to solve the above problems.

The technical solutions adopted by the utility model are as follows:

An intelligent speaker with an energy storage power supply, comprising an intelligent speaker host and a power box, wherein the top of the intelligent speaker host is fixedly connected with a handle, the bottom of the intelligent speaker host is connected with the top of the power box, two side walls of the power box are fixedly connected with corresponding power arms, the bottom of the power box is fixedly connected with a power bin, two sides of the bottom of the power bin are fixedly connected with corresponding fixing legs, a DC motor is fixedly installed between the bottom of the power bin relative to the fixing legs, the power box is a cavity with an upward opening, a support plate is arranged close to the inner wall of the bottom, the top of the support plate is fixedly connected with a stacking frame, and four corresponding battery packs are arranged on the stacking frame, the inside of the power arm is a cavity, the inside of the power arm is fixedly installed with a threaded rod through a bearing, the bottom of the threaded rod penetrates through the power arm and the power bin, an auxiliary pulley is fixedly installed at one end extending to the inside of the power bin, a rotating rod is fixedly installed at the middle position of the power bin through a bearing, the bottom of the rotating rod penetrates through the inner wall of the power bin and is fixedly connected with the DC motor, the rotating rod is fixedly installed with a main pulley relative to the same horizontal line of the auxiliary pulley, and a transmission belt is arranged around the main pulley and the auxiliary pulley.

In a preferred embodiment, a corresponding storage plate is fixedly connected between the two walls of the stacking frame, the bottom of the storage plate is fixedly connected with three linearly arranged buffer springs, the top of the buffer springs is fixedly connected with the storage plate, and the bottom of the buffer springs is fixedly connected with a compression plate.

In a preferred embodiment, the threaded rod is connected with a mobile block through a screw thread, and the side of the mobile block close to the support plate is fixedly connected with a connecting piece.

In a preferred embodiment, the connecting piece penetrates through the outer walls of the power arm and the power box and is fixedly connected with the support plate, and the positions of the power box and the power arm relative to the connecting piece are provided with mobile grooves.

In a preferred embodiment, the top of the power box is plugged into the bottom of the intelligent speaker host, the top of the front and back sides of the power box are fixedly connected with corresponding rotating shafts, the upper and lower ends of the rotating shaft are fixedly connected with connecting plates, the connecting plate at the lower part is fixedly connected with the power box, the connecting plate at the upper part has a L-shaped structure and fits with the top of the intelligent speaker host, and two corresponding fixing bolts are fixedly installed at the place where the connecting plate at the upper part fits with the top of the intelligent speaker host.

In a preferred embodiment, the connecting plate is located on both sides of the handle, and horn mouths are fixedly installed on the left and right sides of the connecting plate on the front side of the intelligent speaker host.

To sum up, through the technical solutions, the utility model has the beneficial effects as follows:

1. In the utility model, the intelligent speaker host is equipped with a plurality of battery packs, which effectively enhance the power supply capability of the energy storage power supply. In most cases, the problem of insufficient power supply will not occur, and all battery packs are isolated by storage plates to prevent collision. At the same time, buffer springs and compression plates can effectively limit the battery packs, further prevent collision of the battery packs, and prolong the service life of the battery packs.

2. In the utility model, the host of the intelligent speaker and the power box are connected through the fixing bolts and connecting plates, which not only ensures tight connection, but also highlights more convenient disassembly during maintenance. At the same time, due to the action of the power arm, the stacking frame can be slowly lifted when starting the DC motor, which is convenient for maintenance and separate disassembly and carrying.

Mark in the figure: 1—intelligent speaker host, 2—power box, 3—handle, 4—power arm, 5—power bin, 6—fixing leg, 7—DC motor, 8—support plate, 9—stacking frame, 10—battery pack, 11—threaded rod, 12—auxiliary pulley, 13—rotating rod, 14—main pulley, 15—transmission belt, 16—storage plate, 17—buffer spring, 18—compression plate, 19—mobile block, 20—connecting piece and 21—connecting plate.

SPECIFIC EMBODIMENTS

In order to make the purpose, technical solutions and advantages of the utility model clearer, the utility model is further described in detail in combination with the drawings and embodiments. It should be understood that the specific embodiments described herein are intended to explain the utility model only and are not intended to limit the utility model.

Figure 1:
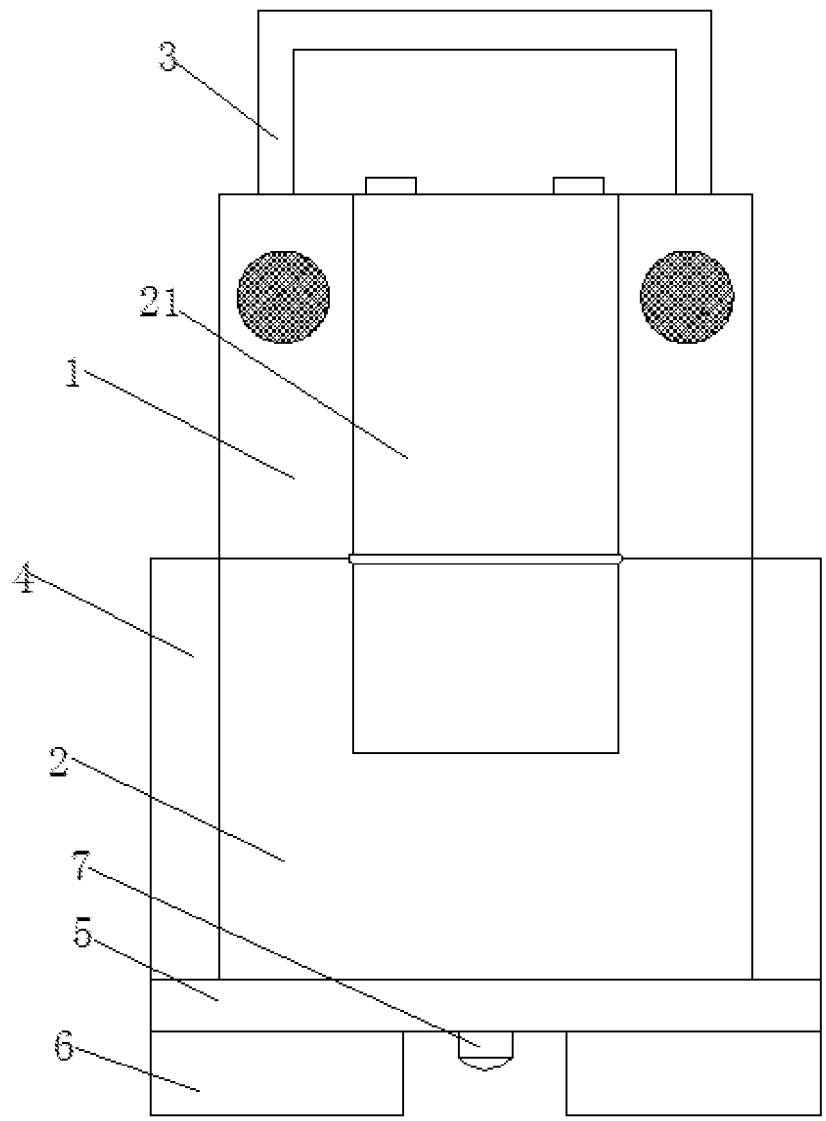
FIG. 1 is a structural schematic diagram of the utility model.
Figure 2:
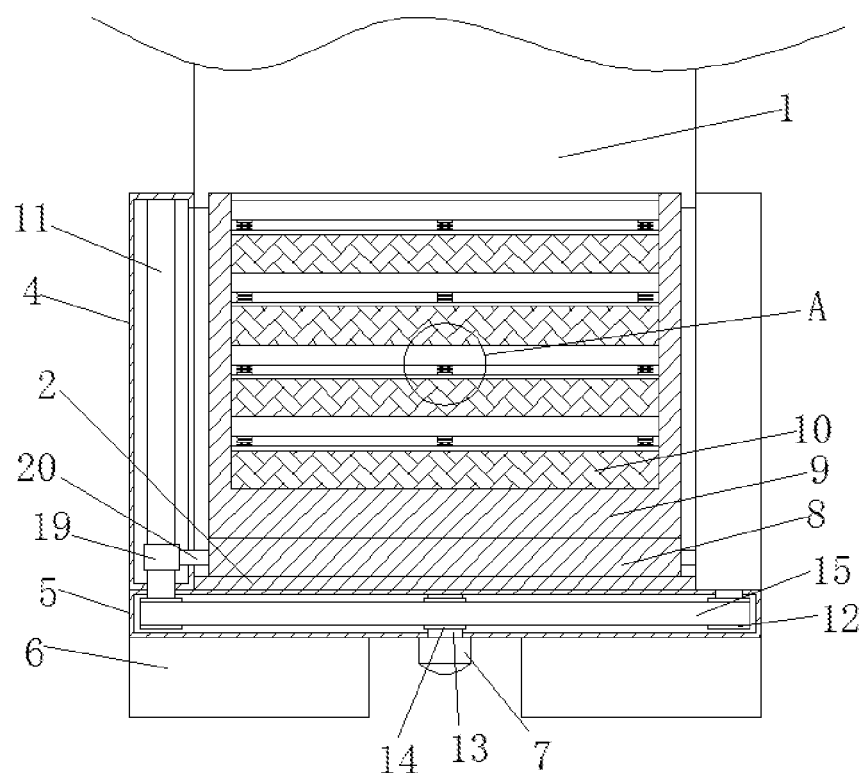
FIG. 2 is a sectional view of the utility model.
Figure 3:
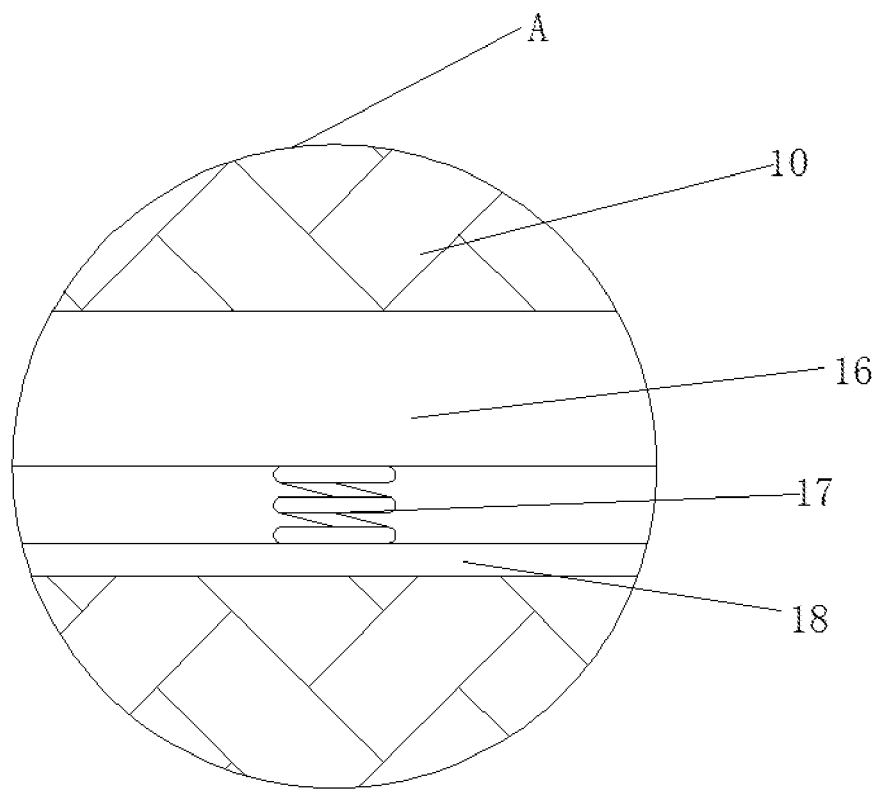
FIG. 3 is an enlarged view of the structure at position A of the utility model.
Figure 4:
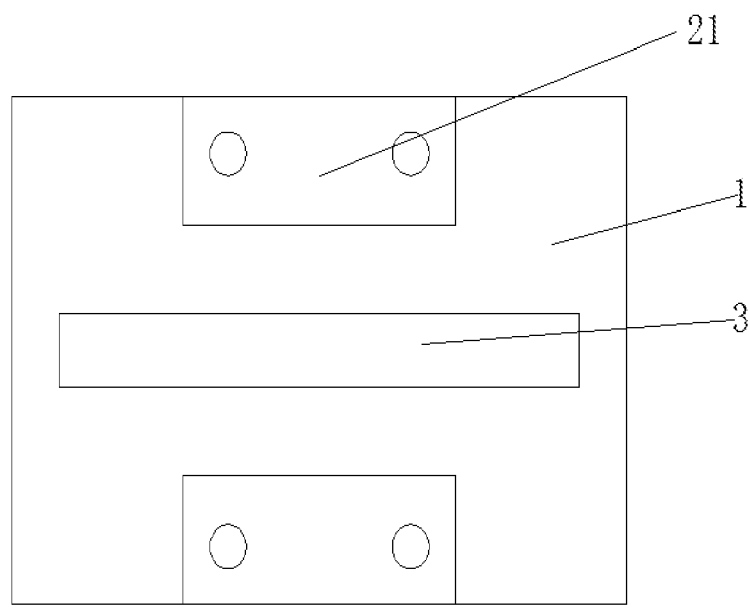
FIG. 4 is a top view of the intelligent speaker host of the utility model.

Referring to FIG. 1-4, an intelligent speaker with an energy storage power supply, comprising an intelligent speaker host 1 and a power box 2, wherein the top of the intelligent speaker host 1 is fixedly connected with a handle 3, which is convenient for carrying, the top of the power box 2 is plugged into the bottom of the intelligent speaker host 1, the top of the front and back sides of the power box 2 are fixedly connected with corresponding rotating shafts, the upper and lower ends of the rotating shaft are fixedly connected with connecting plates 21, the connecting plate 21 at the lower part is fixedly connected with the power box 2, the connecting plate 21 at the upper part has a L-shaped structure and is fitted with the top of the intelligent speaker host 1, two corresponding fixing bolts are fixedly installed at the fitting place between the upper connecting plate 21 and the top of the intelligent sound box host 1, the connecting plates 21 are located on both sides of the handle 3, horn mouths are fixedly installed on the left and right sides of the connecting plate 21 on the front side of the intelligent speaker host 1, the bottom of the intelligent speaker host 1 is connected with the top of the power box 2, two side walls of the power box 2 are fixedly connected with corresponding power arms 4, the bottom of the power box 2 is fixedly connected with a power bin 5, two sides of the bottom of the power bin 5 are fixedly connected with corresponding fixing legs 6, a DC motor 7 is fixedly installed between the bottom of the power bin 5 relative to the fixing legs 6, the power box 2 is a cavity with an upward opening, a support plate 8 is arranged close to the inner wall of the bottom, the top of the support plate 8 is fixedly connected with a stacking frame 9, four corresponding battery packs 10 are arranged on the stacking frame 9, a corresponding storage plate 16 is fixedly connected between the two walls of the stacking frame 9, the bottom of the storage plate 16 is fixedly connected with three linearly arranged buffer springs 17, the top of the buffer spring 17 is fixedly connected with the storage plate 16, the bottom of the buffer spring 17 is fixedly connected with a compression plate 18, the battery pack 10 is isolated by the storage plate 16 to prevent collision, at the same time, the buffer spring 17 and the compression plate 18 can effectively limit the battery pack 10, further prevent collision of the battery pack 10 and improve the service life of the battery pack 10, the inside of the power arm 4 is a cavity, the inside of the power arm 4 is fixedly installed with a threaded rod 11 through a bearing, the bottom of the threaded rod 11 penetrates through the power arm 4 and the power bin 5, an auxiliary pulley 12 is fixedly installed at one end extending to the inside of the power bin 5, the threaded rod 11 is connected with a moving block 19 through a screw thread, a connecting piece 20 is fixedly connected to one side of the mobile block 19 close to the support plate 8, the connecting piece 20 penetrates through the outer wall of the power arm 4 and the power box 2 and is fixedly connected with the support plate 8, the positions of the power box 2 and the power arm 4 relative to the connecting piece 20 are provided with mobile grooves, a rotating rod 13 is fixedly installed at the middle position of the power bin 5 through a bearing, the bottom of the rotating rod 13 penetrates through the inner wall of the power bin 5 and is fixedly connected with the DC motor 7, the rotating rod 13 is fixedly installed with a main pulley 14 relative to the same horizontal line of the auxiliary pulley 12, a transmission belt 15 is arranged around the main pulley 14 and the auxiliary pulley 12, so that the stacking frame 9 can be slowly lifted when the DC motor 7 is started, which is convenient for maintenance and reduces damage caused by the external force to the battery pack 10.

Operating principle: In this application, the battery pack 10 is placed under the storage plate 16, and the compression plate 18 limits and isolates the battery pack 10 under the action of the buffer spring 17, to prevent collision, the intelligent speaker host 1 is plugged on the top of the power box 2, and the connecting plate 21 is fixed on the top of the intelligent speaker host 1 through fixing bolts, so that the intelligent speaker host 1 is tightly connected with the power box 2, and then connected with the battery pack 10 through wires inside the intelligent speaker host 1.

In this application, when the device needs to be maintained or disassembled, the DC Motor 7 is started to control the rotation of the rotating rod 13, so that the main pulley 14 drives the auxiliary pulley 12 to rotate, and the threaded rod 11 drives the mobile block 19 to move up and down, thus lifting the stacking frame 9, and then the battery pack 10 can be replaced or taken out for carrying.

The above is only a preferred embodiment of the utility model, and is not intended to limit the utility model. Any modification, equivalent substitution and improvement made within the spirit and principle of the utility model should be included in the protection scope of the utility model.

The invention claimed is:

1. An intelligent speaker with an energy storage power supply, comprising an intelligent speaker host (1) and a power box (2), wherein the top of the intelligent speaker host (1) is fixedly connected with a handle (3), the bottom of the intelligent speaker host (1) is connected with the top of the power box (2), two side walls of the power box (2) are fixedly connected with corresponding power arms (4), the bottom of the power box (2) is fixedly connected with a power bin (5), two sides of the bottom of the power bin (5) are fixedly connected with corresponding fixing legs (6), a DC motor (7) is fixedly installed between the bottom of the power bin (5) relative to the fixing legs (6), the power box (2) is a cavity with an upward opening, a support plate (8) is arranged close to the inner wall of the bottom, the top of the support plate (8) is fixedly connected with a stacking frame (9), and four corresponding battery packs (10) are arranged on the stacking frame (9), the inside of the power arm (4) is a cavity, the inside of the power arm (4) is fixedly installed with a threaded rod (11) through a bearing, the bottom of the threaded rod (11) penetrates through the power arm (4) and the power bin (5), an auxiliary pulley (12) is fixedly installed at one end extending to the inside of the power bin (5), a rotating rod (13) is fixedly installed at the central position of the power bin (5) through a bearing, the bottom of the rotating rod (13) penetrates through the inner wall of the power bin (5) and is fixedly connected with the DC motor (7), the rotating rod (13) is fixedly installed with a main pulley (14) relative to the same horizontal line of the auxiliary pulley (12), and a transmission belt (15) is arranged around the main pulley (14) and the auxiliary pulley (12).

2. An intelligent speaker with an energy storage power supply according to claim 1, wherein a corresponding storage plate (16) is fixedly connected between the two walls of the stacking frame (9), the bottom of the storage plate (16) is fixedly connected with three linearly arranged buffer springs (17), the top of the buffer springs (17) is fixedly connected with the storage plate (16), and the bottom of the buffer springs (17) is fixedly connected with a compression plate (18).

3. The intelligent speaker with an energy storage power supply according to claim 1, wherein a mobile block (19) is connected with the threaded rod (11) through a screw thread, and a connecting piece (20) is fixedly connected on one side of the mobile block (19) close to the support plate (8).

4. The intelligent speaker with an energy storage power supply according to claim 3, wherein the connecting piece (20) penetrates through the outer wall of the power arm (4) and the power box (2) and is fixedly connected with the support plate (8), and the positions of the power box (2) and the power arm (4) relative to the connecting piece (20) are provided with mobile grooves.

5. The intelligent speaker with an energy storage power supply according to claim 1, wherein the top of the power box (2) is plugged into the bottom of the intelligent speaker host (1), the top of the front and back sides of the power box (2) are fixedly connected with corresponding rotating shafts, the upper and lower ends of the rotating shaft are fixedly connected with connecting plates (21), the connecting plate (21) at the lower part is fixedly connected with the power box (2), the connecting plate (21) at the upper part has a L-shaped structure and fits with the top of the intelligent speaker host (1), and two corresponding fixing bolts are fixedly installed at the place where the connecting plate (21) at the upper part fits with the top of the intelligent speaker host (1).

6. The intelligent speaker with an energy storage power supply according to claim 5, wherein the connecting plate (21) is located at both sides of the handle (3), and horn mouths are fixedly installed on the left and right sides of the connecting plate (21) on the front side of the intelligent speaker host (1).

\* \* \* \* \*